US010273765B2

(12) United States Patent
Lane (10) Patent No.: US 10,273,765 B2
(45) Date of Patent: *Apr. 30, 2019

(54) THREADED CONNECTION (71) Applicant: Bryan Lane, Houston, TX (US)

(72) Inventor: Bryan Lane, Houston, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/438,548

(22) Filed: Feb. 21, 2017

(65) Prior Publication Data

US 2017/0159853 A1    Jun. 8, 2017

Related U.S. Application Data

(63) Continuation-in-part of application No. 14/286,864, filed on May 23, 2014, now Pat. No. 9,644,771.

(60) Provisional application No. 61/832,098, filed on Jun. 6, 2013.

(51) Int. Cl.
*E21B 17/042* (2006.01)
*E21B 17/08* (2006.01)
*F16L 15/00* (2006.01)

(52) U.S. Cl.
CPC ............ *E21B 17/08* (2013.01); *E21B 17/042* (2013.01); *F16L 15/004* (2013.01)

(58) Field of Classification Search
CPC ....... E21B 17/042; F16L 15/002; F16L 15/08; F16L 15/06
USPC .................................................. 285/333, 334
See application file for complete search history.

(56) References Cited

U.S. PATENT DOCUMENTS

| 1,889,870 | A | * | 12/1932 | Montgomery | E21B 17/042 285/110 |
| 2,781,206 | A | * | 2/1957 | Ragland | F16L 15/001 285/106 |
| 4,917,409 | A | * | 4/1990 | Reeves | E21B 17/042 285/334 |
| 5,971,443 | A | * | 10/1999 | Noel | E21B 17/043 285/334 |
| 6,312,024 | B1 | * | 11/2001 | Dutilleul | E21B 17/00 285/333 |
| 6,406,070 | B1 | * | 6/2002 | DeLange | E21B 17/042 285/333 |
| 6,811,189 | B1 | * | 11/2004 | DeLange | F16L 15/008 285/332.1 |
| 9,644,771 | B1 | * | 5/2017 | Lane | E21B 17/042 |
| 2002/0011778 | A1 | * | 1/2002 | Zhang | H01J 1/3044 313/495 |
| 2002/0158469 | A1 | * | 10/2002 | Mannella | E21B 17/042 285/333 |

(Continued)

*Primary Examiner* — David Bochna
(74) *Attorney, Agent, or Firm* — Buskop Law Group, P.C.; Wendy Buskop (57) ABSTRACT

A threaded coupling for joining tubulars for oil and gas field operations forming connected tubulars. The threaded coupling has a body with an outer surface, an inner surface and a central axis, a first tapered edge, a second tapered, and a first coupling bearing face and second coupling bearing faces for supporting load, weight, or both on the connected tubulars. As the inner surface of the body is swaged onto each tubular, the inner surface of the body deflects away from the central axis, providing a plurality of bands of high contact pressure for each metal to metal seal between the inner surface of the body and each connected tubular to sustain seal pressures between the threaded coupling.

17 Claims, 6 Drawing Sheets

(56) References Cited

U.S. PATENT DOCUMENTS

| | | | |
|---|---|---|---|
| 2004/0113423 A1* | 6/2004 | Dell'Erba | E21B 17/042 |
| | | | 285/55 |
| 2006/0152000 A1* | 7/2006 | DeLange | E21B 17/042 |
| | | | 285/334 |
| 2009/0250927 A1* | 10/2009 | Pallini, Jr. | F16L 15/004 |
| | | | 285/334.2 |
| 2011/0025052 A1* | 2/2011 | Goto | E21B 12/06 |
| | | | 285/333 |
| 2012/0074692 A1* | 3/2012 | Chelette | F16L 15/001 |
| | | | 285/333 |

\* cited by examiner

THREADED CONNECTION

CROSS REFERENCE TO RELATED APPLICATIONS

The present application claims priority to and the benefit of U.S. Provisional Patent Application Ser. No. 61/832,098 filed on Jun. 6, 2013, entitled "CONNECTION" and U.S. patent application Ser. No. 14/286,864 filed May 23, 2014 and U.S. Pat. No. 9,644,771 ISSUED on May 9, 2017 U.S. Both references are hereby incorporated in its entirety.

FIELD

The present embodiments generally relate to a threaded coupling that forms a threaded connection between pairs of tubulars by mating pin faces of those tubulars and providing metal to metal seals that sustain pressures equivalent to pipe burst limits without deforming.

BACKGROUND

A need exists for an inexpensive to manufacture load transferring threaded coupling that provides metal to metal seals with capacity equal to the burst pressure of the tubular while providing mating of pin faces.

A further need exists for a threaded coupling that provides the highest torque capacity and is the least expensive, as a one part threaded coupling requiring no additional seal parts.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a threaded coupling for pairs of threaded tubulars for oil and gas field applications.

The following terms are used herein:

The term "alloy of copper" can refer to any alloy that includes the element copper that can be used to plate the surfaces of the threaded coupling. Plating of the threads is completed to inhibit metal transfer known as galling.

The term "alloy of tin" can refers to any alloy that includes the element tin that can be used to plate the surfaces of a threaded coupling. Plating of the threads of the threaded coupling can inhibit metal transfer known as galling.

The term "alloy of zinc" can refers to any alloy that includes the element zinc that can be used to plate the surfaces of the threaded coupling.

The term "anti-corrosion" can refer to a type of coating to prohibit corrosion of the metal materials used for the tubulars and the threaded coupling which are applied to the materials or plating onto the materials to deposit a metallic layer that prevents corrosion.

The term "applied torque" can refer to applying to an assembly of tubulars or a single make-up of a tubular engaging the threaded coupling or applied to the threaded coupling, torque or load by simply holding the threaded coupling and rotating each tubular into the threaded coupling by applying torque to the tubular.

The term "asymmetrical tapered edge" can refer to tapered edges of the threaded coupling that differ in taper angles such that the outer diameter of the taper at the base or lower end of a taper differs from an adjacent taper.

The term "bands of high contact pressure" can refer to contact pressure developed at metal to metal seals due to radial interference caused by the threaded coupling. The bands of high contact pressure are usually short in axial length and can easily exceed the tensile yield strength of the metals in contact.

The term "body" can refer to the main or largest component in the threaded coupling.

The term "cathodic protection" can refer to applying a coating or attaching an object to the threaded coupling to protect it from corrosion by making the threaded coupling into a cathode; and the coating or object into an anode. The object can be a zinc fish or a zinc based coating.

The term "central axis" can refer to the center of the body defined at the radial dimension of zero.

The term "coated" can refer to a covering applied to the threaded coupling outer or inner surface to prohibit corrosion or reduce the required torque during make-up.

The term "connected tubulars" can refer to two tubulars made-up into a threaded coupling.

The term "coupling bearing face" can refer to the surface at the end of the inventive threaded coupling that has an annular surface and is perpendicular to the central axis. The coupling bearing face can have an outer diameter at the base of the tapered edge and an inner diameter at the start of the lead in taper.

The term "central deflection relief groove" can refer to a groove formed in one part of the threaded coupling to allow another part of the threaded coupling to deflect into the space provided by the central deflection relief groove to avoid or influence the type contact that occurs between two parts being joined by the threaded coupling.

The term "encapsulated" can refer to the threaded coupling being coated on all surfaces; typically to inhibit corrosion.

The term "flank" can refer to the angled surface on either side of a relief groove or on either side of a thread form on the threaded coupling.

The term "groove" can refer to thread reliefs, deflection reliefs, and thread form grooves machined along the threaded region of the threaded coupling.

The term "inner surface" of the body can refer to an innermost radial surface of the body, which in embodiments can be a cylindrical shaped body.

The term "lead in taper" can refer to the conical openings at both ends of the threaded coupling. A lead in taper allows the tubular end to be stabbed into the threaded coupling during the make-up procedure.

The term "lubricating powder" can refer to a dry granular solid such as graphite or molydisulphide that reduced the friction at the interfering metal surfaces in contact while using the threaded coupling.

The term "metal to metal seal" can refer to a metal to metal surface contact, namely using first threaded connections to seal high pressure fluids against second threaded connections or in the case of smooth metal surface being contacted against other smooth metal surface to seal under high pressure as dedicated radial metal seals.

The term "metal to metal seal region" can refer to a length along the inner surface of the threaded coupling where radial contact is intended to form the metal seal with the tubular end.

The term "oil and gas field" can refer to an area where oil and gas wells have been or are in the process of being drilled and are or will be producing hydrocarbons from subsurface formations.

The term "outer surface" can refer to the outermost radial surface of the body.

The term "phosphate coating" can refer to a layer of insoluble crystalline phosphates applied using a spray or immersion process to resist corrosion on steel parts of the threaded coupling.

The term "pin face" can refer to an axial surface of the threaded coupling that is perpendicular to the central axis at the end of the tubular after machining processes have formed the threaded regions and metal seal surfaces.

The term "pipe string" can refer to a series of tubulars connected using threaded couplings such that they form a tubular string or "pipe string" which is lowered into a wellbore.

The term "plated" can refer to a metallic layers chemically bonded to the metallic material of the threaded coupling usually with a thickness measured in microns, such as from 3 microns to 10 microns.

The term "preloaded connection" can refer to final connection of tubulars to which a specified torque has been applied at points of radial interference at the threads and seals combined points of contact on pin faces. A preloaded connection for the threaded coupling has a tubular in compression and the body of the threaded coupling in tension forming both radial and axial preload in the connection of tubular and threaded coupling.

The term "radial deflection" can refer to deformation of the threaded coupling or tubular end in a radial direction towards or away from the central axis.

The term "radial depth" can refer to a feature of the threaded coupling or tubular end that has a radial dimension, such as a relief groove or thread form.

The term "raked at an angle" can refer to small acute angles of the metal seal surface relative to the central axis forming an obtuse angle to the second metal seal surface of the threaded coupling.

The term "relief groove" can refer to a groove adjacent to the threaded region or to a metal to metal seal region that interrupts or separates the regions. For the threaded coupling, the relief groove serves as a volume for excess thread lubricant.

The term "seal surface" can refer to a surface where fluid flow from high to low pressure regions is arrested by the threaded coupling. Seal surfaces can use metal to metal contacting surfaces and often use resilient materials to metal contacting surfaces.

The term "semisolid lubricating coating" can refer to for convenience in application and use coatings that harden, are commercially available and can be applied to the threaded coupling. Examples of this coating can include fluoroelastomers based coatings based on PTFE.

The term "solid lubricating coating" can refer to a formulation of anti-friction materials that can be applied to the threaded coupling's threads and seal regions or to the threads or seal regions of the tubular that will not fall or melt off during storage and handling before assembly into a string.

The term "swaged onto each tubular" can refer to a radial interfering threaded metal to metal seal surface regions of the tubular which is created by applying torque to the tubular and rotating the tubular.

The term "tapered edge" can refer to a beveled or chamfered edge formed on the body; in the case of a cylindrical shape a squared edge is tapered from a larger diameter to a smaller diameter.

The term "thread height" can refer to the thread form machined onto the outer surface of the tubular end and the inner surface of the threaded coupling that has a radial dimension defined as the thickness.

The term "thread pitch" can refer to the threaded region of the threaded coupling that is machined using a thread form along a helical path where each wrap of the thread form is closely fit next to the previous wrap forming a continuous helical thread where the axial distance between crests and grooves is defined as the pitch.

The term "thread thickness" can refer to a thread form machined onto the outer surface of the tubular end and the inner surface of the threaded coupling that has an axial dimension defined as the thickness.

The term "threaded coupling" can refer to a cylindrical shaped tube generally two to five diameters in length that has a thread form machined onto each end almost always on the inside surface. Threaded couplings can be a metallic material.

The term "threaded region" can refer to the zone at the end of a tubular or at either end of the threaded coupling where the thread form is machined.

The term "threaded relief groove" can refers to a groove adjacent to the threaded portion or threaded section, or refers to a metal to metal seal region that allows machine tools to complete the threaded forms.

The term "torque transfer" can refer to torque applied to each tubular during make-up with the threaded coupling that is reacted by the radial interference at the threads and seals but when the pin faces meet, the torque is transferred from the tubular being torqued to the tubular already made-up into the threaded coupling.

The term "tubular" can refer to a pipe or conduit generally circular in cross section of variable length in excess of 20 feet. In oil and gas wells typically used to create a barrier to retain pressurized fluid or to allow fluids to flow to or from the surface.

The term "viscous liquid lubricating coating" can refer to a liquid or emulsion generally of hydrocarbon or synthetic materials such as oil or grease with anti-friction solid additives that can be applied to the threaded coupling.

The threaded coupling uniquely provides bands of high pressure contact pressure without localized peak levels, forming high quality continuous metal to metal seals.

A benefit of the invention is that by utilizing the existing industry standards for threaded and coupled pipe used for wellbore tubulars, the threaded coupling can be reproduced easily on existing stock of piping.

Another benefit of the invention is that the threaded coupling allows torque control for make-up as compared to existing couplings that use positional control for make-up.

The threaded coupling can cause the pin faces of the tubulars to meet, with the pin faces absorbing torque forces applied during tubular make-up.

Yet another benefit of the invention is that through an efficient use of materials and low-cost connection methods, the threaded coupling can provide a metal to metal seal that is typically only possible in premium-cost couplings.

The threaded coupling is expected to reduce at least 10 percent of the leaks common with standard or commercially available tubular casing connections.

The embodiments relate to a threaded coupling for engaging pipe or tubulars.

The threaded coupling can be used for joining a first tubular with a first mating pin face to a second tubular with a second mating pin face for oil and gas field operation, forming connected tubulars.

The threaded coupling can have a body with an outer surface, an inner surface, and a central axis.

The body can have a first tapered edge extending from the outer surface. The body can have a second tapered edge extending from the outer surface opposite the first tapered edge. In embodiments, the second tapered edge can be symmetrical to the first tapered edge.

The threaded coupling can have a first coupling bearing face formed on the first tapered edge for supporting at least one load or weight on the connected tubulars.

The threaded coupling can have a second coupling bearing face symmetrical with the first bearing face. The second coupling bearing face can be formed on the second tapered edge for supporting at least one load or weight on the connected tubulars.

The threaded coupling can have an inner surface of the body. The inner surface can form a metal to metal seal with a pipe or tubular.

The inner surface of the body can have a first threaded region with a first threaded relief groove having a first threaded region metal seal surface. When a first tubular connects with the first threaded region at a first radial surface, a first metal to metal seal can be formed between the first threaded region metal seal surface and the first radial surface.

The inner surface of the body can have a second threaded region with a second threaded relief groove having a second threaded region metal seal surface.

When a second tubular connects with the second threaded region at a first radial surface of the second tubular, a second metal to metal seal can be formed between the second threaded region metal seal surface and the first radial surface.

In embodiments, the first and the second metal to metal seal surfaces can be raked towards each other relative to the central axis.

The threaded coupling can have a central deflection relief groove positioned between the first threaded region metal seal surface and the second threaded region metal seal surface.

As the inner surface of the body is swaged onto each tubular, the inner surface of the body deflects away from the central axis of the body, providing a band of high contact pressure for each metal to metal seal between the inner surface of the body and each connected tubular to sustain seal pressures between the threaded coupling and each tubular that is equivalent to or greater than the burst pressure of the tubular.

In embodiments, first and second threaded relief grooves with first and second sloped flanks and a central deflection relief groove positioned between the first and the second metal seal surfaces can allow radial deflection at the pin faces due to applied torque of a preloaded connection using a radial depth no more than 30 percent the radial depth of the first and the second threaded relief grooves.

Embodiments can feature a triple seal redundancy with two metal seal positions and a thread compound seal, thereby providing additional safeguards against errors that can occur during manufacturing and installation. If one seal is defeated, the other two seals still hold.

In embodiments, the threaded coupling can be 10 percent to 20 percent shorter than those found in existing industry standards, thereby conserving material and reducing waste.

The apparatus can provide metal to metal seals without using material on the inner surface typically utilized in premium-cost couplings.

The embodiments can contain a pin profile that can be machined from an existing American Petroleum Institute (API) standard threaded pipe, or from surplus pipe stock thereby reducing manufacturing costs, generated waste, and overall energy footprints.

The threaded coupling can be used between standard API tubulars, or the threaded coupling can be used as a cross-over between tubulars and standard API tubulars forming a casing string in a wellbore without having to special order or custom thread additional tubulars.

The threaded coupling can be made from various types of metals including low alloy carbon steel, alloy steel, corrosion resistant alloys that include chromium, nickel, and combinations thereof.

In embodiments, the threaded coupling can have a body with a body thickness from 0.25 inches to 0.75 inches, a thread with a pitch from 0.125 inches to 0.25 inches, a thread thickness with a width from 0.05 inches to 0.2 inches, and a height from 0.025 inches to 0.125 inches.

The threaded coupling can have the first and the second relief grooves each groove with a depth from 100 percent to 150 percent of the height of the threads in the threaded regions.

In an embodiment, for a 5.5 inch outer diameter pipe, the threaded coupling can be 8.25 inches long, have an outer diameter of 6.25 inches, an overall body thickness of 0.54 inches, a thread thickness of 0.1 inches, and a thread height of 0.062 inches.

The threaded coupling can be usable on piping with differing wall thicknesses, such as 3.5 inch outer diameter pipe, as well as pipes with outer diameters of 4 and ½ inches, 5 inches, 6 and ⅝ inches, 7 inches, 7 and ⅝ inches, 8 and ⅝ inches, 9 and ⅝ inches, 10 and ¾ inches, and 13 and ⅜ inches. The threaded coupling can also be used on 20 inch diameter pipe.

In other embodiments, the threaded coupling can be on any size pipe, such as 60 in diameter pipe, for major waste water municipal projects, like the transfer of fresh water from the Russian River in California to the City of San Francisco.

In an embodiment, the threaded coupling can be coated at least on the outer diameter.

In embodiments, the first and the second threaded relief grooves can each have a depth from 100 percent to 150 percent of the height of threads in the threaded regions.

In embodiments, the first and the second tapered edges can be smooth.

Figure 1A:
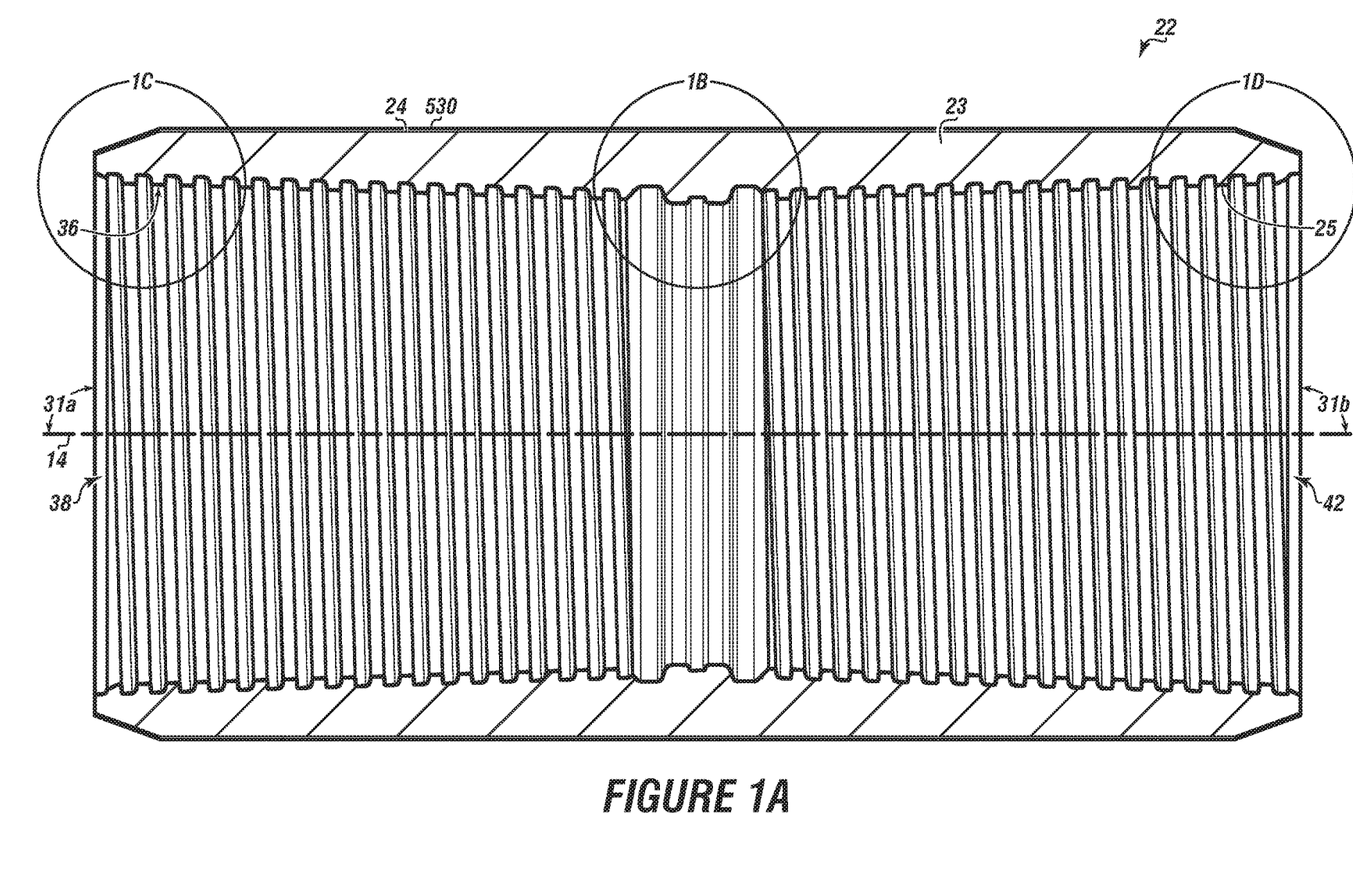
FIG. 1A depicts a cutaway view of the threaded coupling.

Turning now to the Figures, FIG. 1A depicts a cutaway of the threaded coupling.

The threaded coupling 22 can be used to engage an end of a tubular.

The threaded coupling can have a body 23. The body 23 can have an inner surface 36 and an outer surface 24 formed around a central axis 14.

The inner surface 36 can have a first threaded region 38 and a second threaded region 42 formed on the inner surface of the threaded coupling. The threaded regions can include threads 25.

Two bearing face angles 31a and 31b are shown. Each bearing face angle can be for one of the coupling bearing faces (shown in FIGS. 1C and 1D). Each bearing face angle can be substantially perpendicular, such as at 90 degrees+/−10 degrees to the central axis, allowing each coupling bearing face to support the connected tubulars.

The threaded coupling 22 can have an anti-corrosion material 530 on the outer surface 24 providing cathodic protection disposed over a portion of the threaded coupling. In embodiments, the anti-corrosion material can form a zinc anode.

Figure 1B:
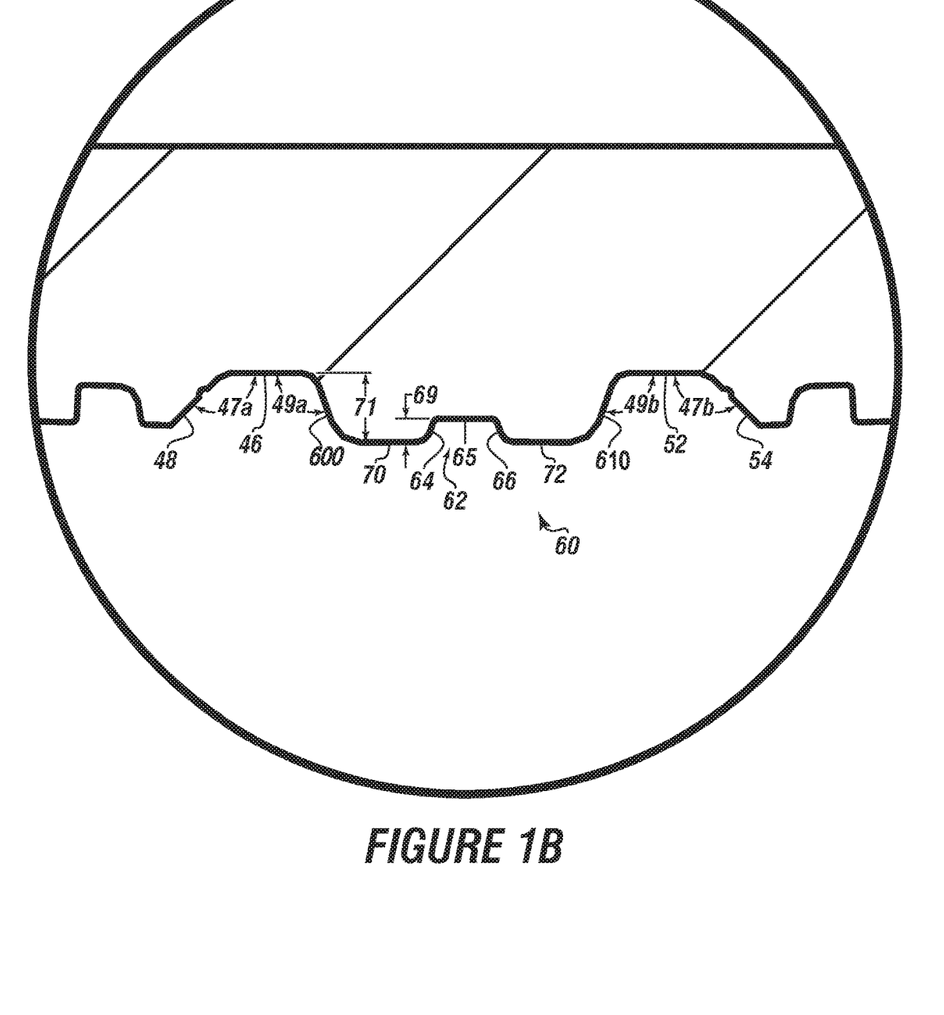
FIG. 1B depicts a detailed view of the metal to metal seal region.

FIG. 1B depicts a detailed view of the metal to metal seal region.

The threaded coupling can have a metal to metal seal region 60. The metal to metal seal region 60 can have a first metal seal surface 70 and a second metal seal surface 72. The first metal seal surface 70 can be raked toward the second metal seal surface 72 at an angle from −10 degrees to +10 degrees relative to the central axis.

In this embodiment, the threaded coupling can have a first threaded relief groove 46 with a first threaded relief groove first flank 48 with a first threaded relief groove first flank angle 47a that can be from 40 degrees to 50 degrees relative to the central axis.

The first threaded relief groove can have a first threaded relief groove second flank 50 extending at a first threaded relief groove second flank angle 49a that can be from 75 degrees to 90 degrees relative to the central axis.

The threaded coupling can have a second threaded relief groove 52 with a second threaded relief groove first flank 54 extending at a second threaded relief groove first flank angle 47b that can be from 40 degrees to 50 degrees relative to the central axis.

The second threaded relief groove can have a second threaded relief groove second flank 56 extending at a second threaded relief groove second flank angle 49b that can be from 75 degrees to 90 degrees relative to the central axis.

The threaded coupling can have a central deflection relief groove 62 formed between a first sloped flank 64 and second sloped flank 66.

The central deflection relief groove 62 can have a first sloped flank 64, a deflection groove inner surface 65, and a second sloped flank 66. The combination of the first sloped flank, deflection groove inner surface and second sloped flank can allow radial deflection of the first and second mating pin faces (shown in FIG. 2) when torque is applied from the tubulars onto the threaded coupling.

The central deflection relief groove 62 can have a deflection radial depth 69 between the first and second sloped flanks of no more than 30 percent of the threaded relief radial depth 71 of the first and the second threaded relief grooves.

The first and the second metal seal surfaces 70 and 72 each can be raked at an angle from −10 degrees to +10 degrees relative to the central axis. The first metal seal surface and the second metal seal surface can be formed on each side of the central deflection relief groove.

The central deflection relief groove can have surfaces allowing for radial pin face deflection due to the applied torque of a preloaded connection.

The radial depth of the central deflection relief groove formed as the sloped flanks meet the inner surface of the central deflection relief groove can be up to 30 percent the radial depth of the first and the second threaded relief grooves.

As the threaded coupling is swaged into each tubular, the threaded coupling can deflect away from a horizontal plane, providing bands of uniform high contact pressure to ensure both metal to metal seal portions hold fluid pressures equivalent to the burst pressure of the tubulars. High contact pressure can range from 10,000 psi to 300,000 psi.

Figure 1C:
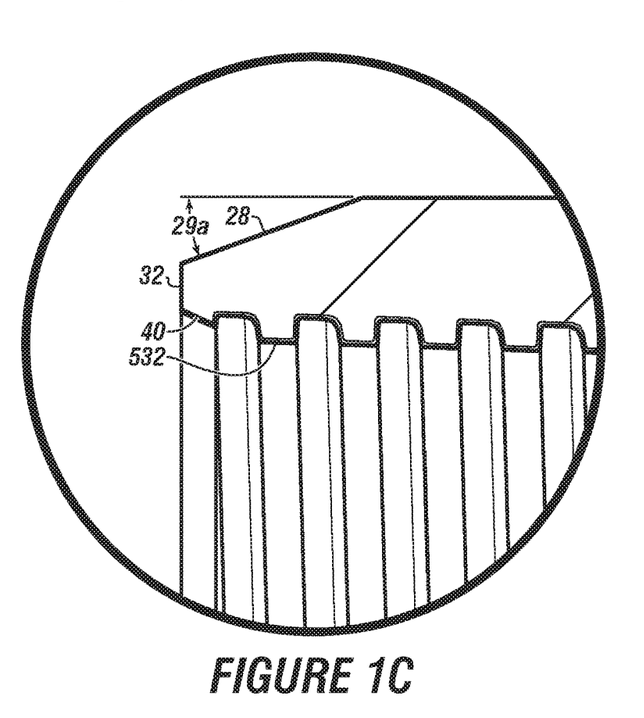
FIG. 1C depicts a detailed view of a first end of the threaded coupling of FIG. 1A.

FIG. 1C depicts a detailed view of a first end of the threaded coupling.

The threaded coupling can have a first tapered edge 28 extending from the outer surface having a first angle 29a that can be from 10 degrees to 40 degrees from the central axis. The slope of the first tapered edge 28 can be oriented towards one of the tubulars.

The threaded coupling can have a first coupling bearing face 32 formed on the first tapered edge at a substantially perpendicular angle, such as a 90 degree angle+/−10 degrees from the central axis.

The threaded coupling can have a first lead in taper 40 formed on the inner surface.

In embodiments, a lubricating coating 532 can be disposed on the threads of the threaded coupling. The lubricating coating can be at least one of: a lubricating powder, a solid lubricating coating, a viscous liquid lubricating coating, and a semisolid lubricating coating.

Figure 1D:
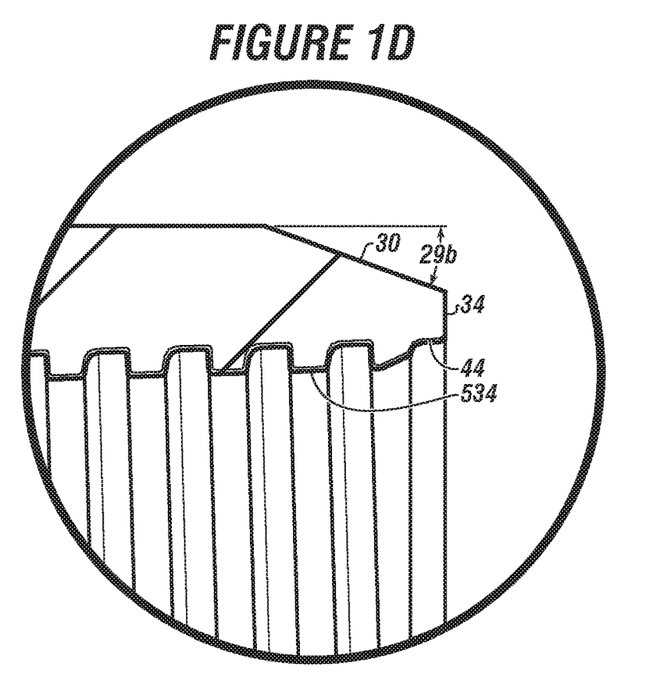
FIG. 1D depicts a detailed view of a second end of the threaded coupling of FIG. 1A.

FIG. 1D depicts a detailed view of a second end of the threaded coupling.

The threaded coupling can have a second tapered edge 30 extending from the outer surface.

The second tapered edge 30 can have a second angle 29b extending from the outer surface from 10 degrees to 40 degrees from the central axis. The slope of the first tapered edge 30 can be oriented, or raked, toward one of the tubulars.

In embodiments, the second tapered edge can be symmetrical to the first tapered edge.

In embodiments, a first tapered edge can be formed asymmetrical to a second tapered edge and each tapered edge can extend from the outer surface at angles 29a and 29b respectively, with each angle being at a different degree. Each angle can vary from 10 degrees to 40 degrees from the central axis.

The threaded coupling can have a second coupling bearing face 34 formed on the second tapered edge at a substantially perpendicular angle, such as a 90 degree angle+/−10 degrees to the central axis.

A second lead in taper 44 can be formed on the inner surface between the second threaded region and the second coupling bearing face In embodiments, a plating 534 can be disposed on a portion of the threads of the threaded coupling. In embodiments, the plating is at least one of an alloy of zinc, an alloy of copper, and a tin.

In embodiments, the alloy of copper is a Cu—Zn—X1 alloy, wherein X1 is one or more elements selected from Sn, Bi, and In.

In embodiments, the alloy of copper can have a composition of: 20 percent to 70 percent copper, 2 percent to 25 percent zinc, and a third component of X1, wherein the total amount of X1 is from 22 percent to 64 percent.

Figure 2:
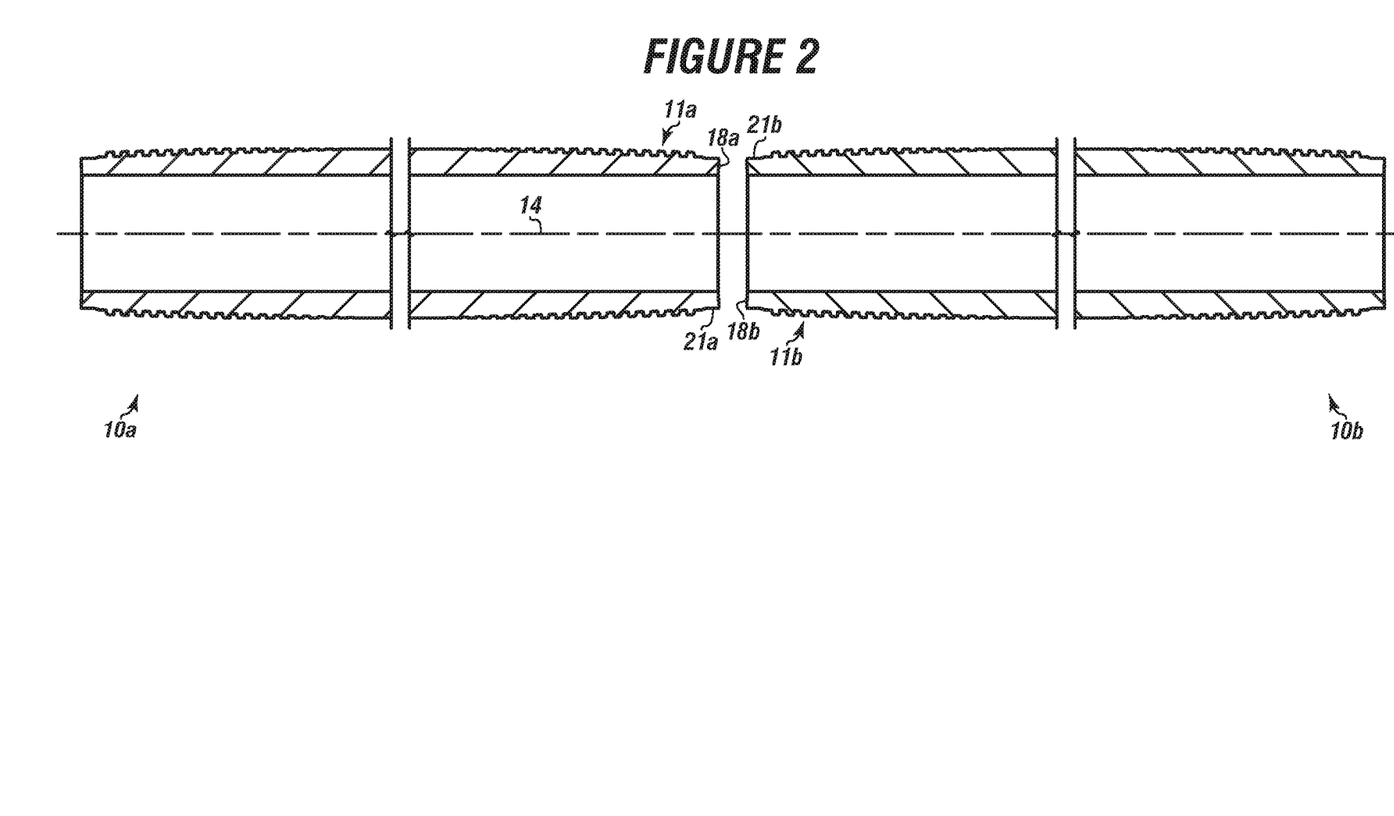
FIG. 2 depicts a cutaway view of two tubulars usable with the threaded coupling to form a threaded connection.

FIG. 2 depicts a cutaway view of two tubulars usable with the threaded coupling.

The first tubular 10a can be made up of a first tubular threaded region 11a, a first radial surface 21a, and a first mating pin face 18a.

The second tubular 10b can be made up of a second tubular threaded region 11b, second radial surface 21b, and a second mating pin face 18b.

Figure 3:
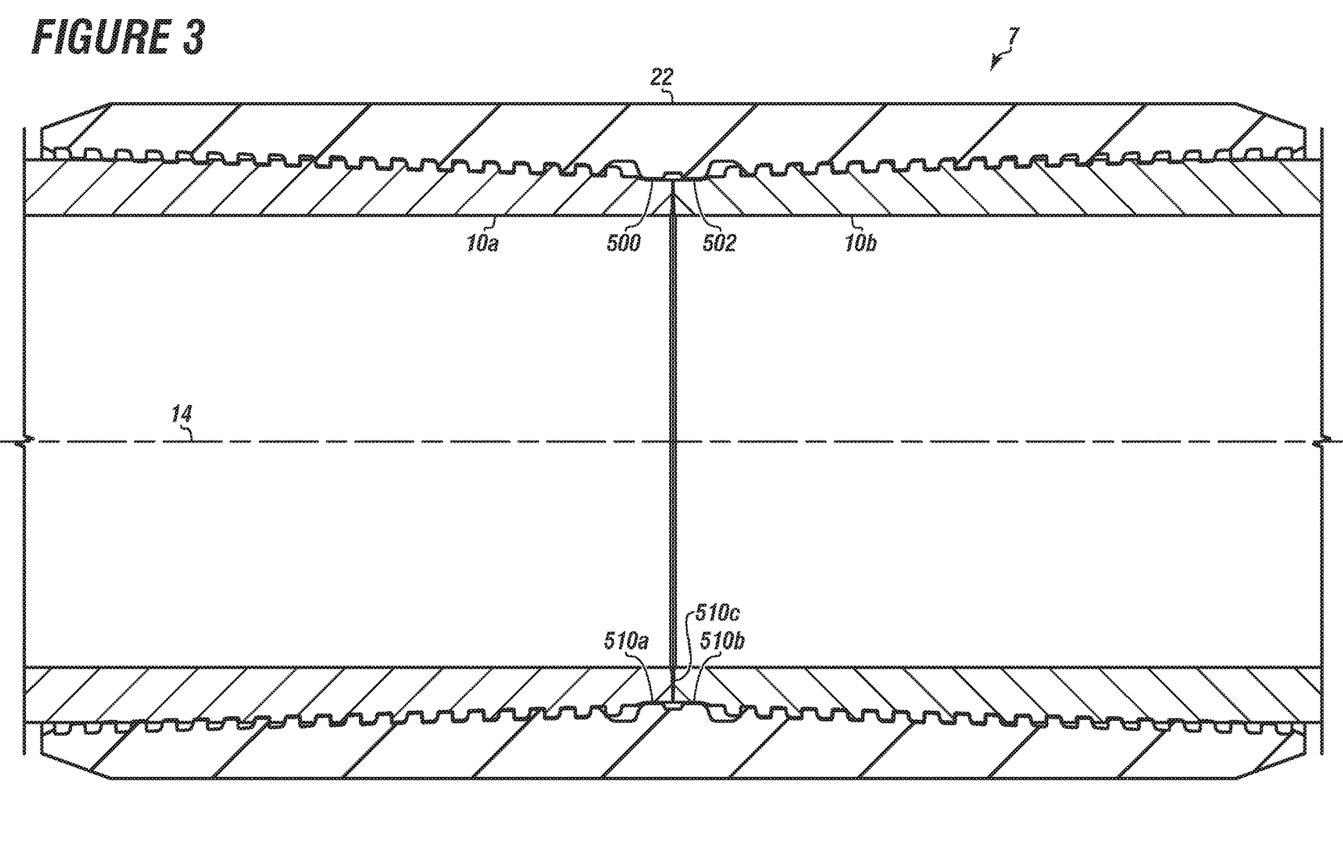
FIG. 3 is a cutaway view of the threaded connection.

Each mating pin face can absorb torque from the tubular threaded regions creating a band of high contact pressure (shown in FIG. 3).

The first mating pin face 18a can be formed substantially traverse to the central axis 14. The first mating pin face 18a can be formed at an angle from 80 degrees to 90 degrees from the central axis 14.

The second mating pin face 18b can be formed substantially traverse to the central axis 14. The second mating pin face 18b can be formed at an angle from 80 degrees to 90 degrees from the central axis 14.

The first radial surface 21a can be formed between the first mating pin face 18a and the first tubular threaded region 11a. The first radial surface 21a can be substantially longitudinal with the central axis 14. The first radial surface 21a can be formed at an angle from −10 degrees to +10 degrees from the central axis 14.

The second radial surface 21b can be formed between the second mating pin face 18b and the second tubular threaded region 11b. The second radial surface 21b can be substantially longitudinal with the central axis 14. The second radial surface 21b can be formed at an angle from −10 degrees to +10 degrees from the central axis 14.

FIG. 3 depicts a cutaway view of connected tubulars.

The tubulars 10a and 10b can have mating pin faces mated inside the threaded coupling, forming multiple metal to metal seals between the joined threads creating connected tubulars 7.

The threaded coupling 22 can be swaged onto the tubulars 10a and 10b. A first metal to metal seal can be formed 500 between the first metal seal surface and the first radial surface.

A second metal to metal seal 502 can be formed between the second metal seal surface and the second radial surface.

The first and the second metal seal surfaces can be raked towards each other relative to the central axis 14.

As the inner surface of the body of the threaded coupling is swaged onto each tubular, the inner surface deflects away from the central, providing bands of high contact pressure 510a, 510b, and 510c for each metal to metal seal between the inner surface of the body and each connected tubular to sustain seal pressures between the threaded coupling and each tubular that is equivalent to or greater than the burst pressure of the tubular.

The threaded coupling, in embodiments, can further have a phosphate coating disposed over the threaded coupling, encapsulating the threaded coupling, wherein the phosphate coating can have a thickness from 1 mil to 2 mils.

Figure 4:
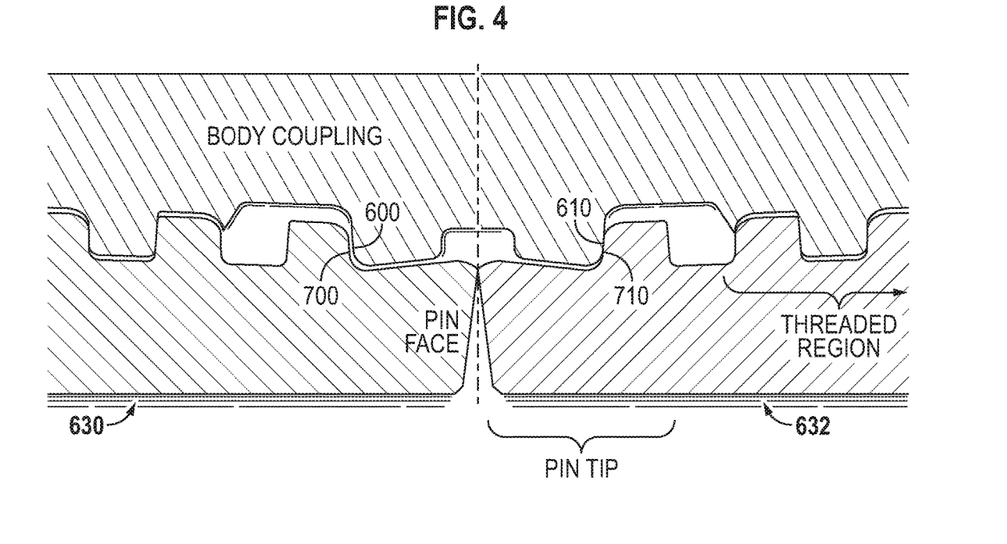
FIG. 4 is a detail of FIG. 3.

FIG. 4 is a detail of FIG. 3.

In this embodiment, the threaded connection 7 for joining a first tubular 10a and second tubular 10b has a coupling for engaging a first pin 630 and a second pin 632.

The coupling 22 has a central deflection relief groove 62 a first metal seal surface 70 on one side of the central deflection relief groove 62; and a first coupling minimal radial shoulder 600 adjacent the first metal seal surface 70; the first coupling minimal radial shoulder extending an angle from 75 degrees to 105 degrees from a central axis 14 of the threaded connection.

In this version of the invention, a first threaded relief groove 46 positioned adjacent the first coupling minimal radial shoulder 600.

A first coupling minimal radial shoulder 600 is adjacent the first metal seal surface 70, the first coupling minimal radial shoulder 600 extending at an angle from 75 degrees to 90 degrees relative to the central axis 14 of the threaded connection.

As suggested in earlier version, a first threaded region 38 is adjacent the first threaded relief groove first flank 48.

A first coupling bearing face 32 is adjacent to the first threaded region 38 for supporting load, weight, or both load and weight on the connected tubulars.

A first tapered edge 28 extends from the first threaded region 38 to an outer surface 24 of the coupling.

A second metal seal surface 72 is on an opposite side of the central deflection relief groove 62.

A second coupling minimal radial shoulder 610 is adjacent the second metal seal surface 72, the second coupling minimal radial shoulder 610 extending at an angle from 75 degrees to 90 degrees relative to the central axis of the threaded connection 7.

A second threaded relief groove 52 positioned adjacent the second coupling minimal radial shoulder 610.

A second threaded relief groove flank 56 is adjacent the second metal seal surface 72, the second threaded relief groove flank 56 extending at an angle from 75 degrees to 90 degrees relative to the central axis of the threaded connection 7.

In this embodiment, a second threaded region 42 adjacent a second threaded relief groove first flank 54; and a second coupling bearing face 34 adjacent to the second threaded region for supporting load, weight, or both load and weight on the connected first and second tubulars.

A second tapered edge 30 extending from the second threaded region 42 to an outer surface 24 of the coupling opposite the first tapered edge 28.

This Figure shows the first pin 630.

The first pin is suggested in earlier Figures having a first axial mating pin face 18a, a first metal seal surface 21a for engaging a first metal seal surface on the coupling, the first metal seal surface adjacent to the first axial mating pin face; a first pin minimal radial shoulder 700 adjacent the first metal seal surface 21a; the first pin minimal radial shoulder 700 extending an angle 75 degrees to 105 degrees from a central axis 14 of the threaded connection.

The first pin 630 has a first threaded region 11a formed adjacent the minimal radial shoulder for forming a threaded connection between the coupling and the first pin.

A second pin is shown, with the second pin 632 having a second axial mating pin face 18b; a second metal seal surface 21b for engaging a second metal seal surface on the coupling, the second metal seal surface adjacent to the second axial mating pin face; a second pin minimal radial shoulder 710 adjacent the second metal seal surface; the second pin minimal radial shoulder extending an angle 75 degrees to 105 degrees from a central axis of the threaded connection.

In this embodiment, a second tubular threaded region 11b is formed adjacent the second pin minimal radial shoulder for forming a threaded connection between the coupling and the second pin.

The inner surface of the coupling deflects away from the central axis of the threaded connection, providing a plurality of bands of high contact pressure 510a, 510b forming first and second metal to metal seals 500,502 between an inner surface 36 of the coupling and each of the first and second tubulars to sustain seal pressures between the coupling and the first and second tubulars equivalent to or greater than a burst pressure of each tubular.

While these embodiments have been described with emphasis on the embodiments, it should be understood that within the scope of the appended claims, the embodiments might be practiced other than as specifically described herein.

What is claimed is:

1. A threaded connection 7 for joining a first tubular 10a and second tubular 10b, the threaded connection comprising:
   1. a coupling for engaging a first pin 630 and a second pin 632, the coupling 22 comprising:
      a. a central deflection relief groove 62;
      b. a first metal seal surface 70 on one side of the central deflection relief groove 62;
      c. a first coupling minimal radial shoulder 600 adjacent the first metal seal surface 70; the first coupling minimal radial shoulder extending an angle from 75 degrees to 105 degrees from a central axis 14 of the threaded connection;
      d. a first threaded relief groove 46 positioned adjacent the first coupling minimal radial shoulder 600;
      e. a first threaded region 38 adjacent the first threaded relief groove first flank 48;
      f. first coupling bearing face 32 adjacent to the first threaded region 38 for supporting load, weight, or both load and weight on the connected tubulars;
      g. a first tapered edge 28 extending from the first threaded region 38 to an outer surface 24 of the coupling;
      h. a second metal seal surface 72 on an opposite side of the central deflection relief groove 62;
      i. a second coupling minimal radial shoulder 610 adjacent the second metal seal surface 72; the second coupling minimal radial shoulder extending an angle from 75 degrees to 105 degrees from the central axis of the threaded connection;
      j. a second threaded relief groove 52 positioned adjacent the second coupling minimal radial shoulder 610;
      k. a second threaded region 42 adjacent a second threaded relief groove first flank 54;
      l. a second coupling bearing face 34 adjacent to the second threaded region for supporting load, weight, or both load and weight on the connected first and second tubulars;
      m. a second tapered edge 30 extending from the second threaded region 42 to an outer surface 24 of the coupling opposite the first tapered edge 28; the first pin 630 comprising:
      n. a first axial mating pin face 18a,
      o. a first metal seal surface 21a for engaging a first metal seal surface on the coupling, the first metal seal surface adjacent to the first axial mating pin face;
      p. a first pin minimal radial shoulder 700 adjacent the first metal seal surface 21a; the first pin minimal radial shoulder 700 extending an angle 75 degrees to 105 degrees from a central axis 14 of the threaded connection,
      q. a first threaded region 11a formed adjacent the minimal radial shoulder for forming a threaded connection between the coupling and the first pin; the second pin 632 comprising:
      r. a second axial mating pin face 18b;
      s. a second metal seal surface 21b for engaging a second metal seal surface on the coupling, the second metal seal surface adjacent to the second axial mating pin face;
      t. a second pin minimal radial shoulder 710 adjacent the second metal seal surface; the second pin minimal radial shoulder extending an angle 75 degrees to 105 degrees from a central axis of the threaded connection,
      u. a second tubular threaded region 11b formed adjacent the second pin minimal radial shoulder for forming a threaded connection between the coupling and the second pin; and
      wherein the inner surface of the coupling deflects away from the central axis of the threaded connection, providing a plurality of bands of high contact pressure 510a, 510b forming first and second metal to metal seals 500,502 between an inner surface 36 of the coupling and each of the first and second tubulars to sustain seal pressures between the coupling and the first and second tubulars equivalent to or greater than a burst pressure of each tubular.

2. The threaded connection of claim 1, wherein the first tapered edge has a first angle, the second tapered edge has a second angle, and each angle extends from 10 degrees to 40 degrees from the central axis of the threaded connection.

3. The threaded connection of claim 1, comprising a bearing face angle 31a for each coupling bearing face, wherein each bearing face angle is substantially perpendicular to the central axis of the threaded connection, and each coupling bearing face supports the connected first and second tubulars.

4. The threaded connection of claim 1, wherein the first tapered edge is asymmetrical to the second tapered edge, and wherein each tapered edge extends from the outer surface of the coupling at an angle from 10 degrees to 40 degrees from the central axis of the threaded connection.

5. The threaded connection of claim 1, comprising a first lead in taper 40 formed between the first threaded region and the first coupling bearing face, and a second lead in taper 44 formed between the second threaded region and the second coupling bearing face.

6. The threaded connection of claim 1, wherein the first metal seal surface is raked towards the second metal seal surface at an angle from −10 degrees to +10 degrees relative to the central axis of the threaded connection.

7. The threaded connection of claim 1, wherein the central deflection relief groove comprises: a first sloped flank 64, a deflection groove inner surface 65, and a second sloped flank 66, and the combination of the first sloped flank, the deflection groove inner surface and the second sloped flank enabling radial deflection of the first and second mating pin faces 18ab when torque is applied to the first tubular and second tubulars.

8. The threaded connection of claim 7, wherein the central deflection relief groove has a deflection radial depth between the first and second sloped flanks of no more than 30 percent of a threaded relief radial depth of the first and the second threaded relief grooves.

9. The threaded connection of claim 7, wherein each mating pin face absorbs torque from the first and second threaded regions creating a single band of high contact pressure 510c.

10. The threaded connection of claim 1, wherein the coupling has a body thickness from 0.25 inches to 2 inches.

11. The threaded connection of claim 1, wherein each threaded region comprises:

1. threads with a pitch from 0.125 inches to 0.5 inches;
2. threads with a thread thickness with a width from 0.05 inches to 0.5 inches; and
3. threads with a thread height from 0.02 inches to 0.25 inches.

12. The threaded connection of claim 11, comprising a lubricating coating 532 disposed on each threaded region, wherein the lubricating coating comprises at least one of: a lubricating powder, a solid lubricating coating, a viscous liquid lubricating coating, and a semisolid lubricating coating.

13. The threaded connection of claim 11, comprising a plating 534 disposed on a portion of the threaded region, wherein the plating comprises: an alloy of zinc, an alloy of copper, a tin, or combinations thereof.

14. The threaded connection of claim 13, wherein the alloy of copper is a Cu—Zn—X1 alloy, wherein X1 is one or more elements selected from Sn, Bi, and In.

15. The threaded connection of claim 14, wherein the alloy of copper has a composition of: 20 percent to 70 percent copper, 2 percent to 25 percent zinc, and a third component of X1 wherein the total amount of X1 is from 22 percent to 64 percent.

16. The threaded connection of claim 1, comprising an anti-corrosion material 530 on the outer surface of the coupling providing cathodic protection on a portion of the threaded connection.

17. The threaded connection of claim 1, comprising a phosphate coating disposed over the coupling, encapsulating the coupling, wherein the phosphate coating has a thickness from 1 mil to 2 mils.

* * * * *